US011319441B2

(12) United States Patent
Chiong

(10) Patent No.: US 11,319,441 B2
(45) Date of Patent: May 3, 2022

(54) METHOD FOR FORMING A POLYARYLENE SULFIDE

(71) Applicant: Ticona LLC, Florence, KY (US)

(72) Inventor: Hendrich A. Chiong, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 0 days.

(21) Appl. No.: 17/111,658

(22) Filed: Dec. 4, 2020

(65) Prior Publication Data
US 2021/0189127 A1 Jun. 24, 2021

Related U.S. Application Data

(60) Provisional application No. 62/951,096, filed on Dec. 20, 2019.

(51) Int. Cl.
C08L 81/02 (2006.01)
C08K 5/3415 (2006.01)
C08G 75/0277 (2016.01)

(52) U.S. Cl.
CPC .......... C08L 81/02 (2013.01); C08G 75/0277 (2013.01); C08K 5/3415 (2013.01)

(58) Field of Classification Search
None
See application file for complete search history.

(56) References Cited

U.S. PATENT DOCUMENTS

| | | |
|---|---|---|
| 3,407,182 A | 10/1968 | Hinton |
| 3,869,433 A | 3/1975 | Campbell |
| 3,919,177 A | 11/1975 | Campbell |
| 4,038,259 A | 7/1977 | Campbell et al. |
| 4,038,260 A | 7/1977 | Campbell |
| 4,038,262 A | 7/1977 | Edmonds, Jr. |
| 4,038,263 A | 7/1977 | Edmonds, Jr. et al. |
| 4,039,518 A | 8/1977 | Campbell |
| 4,056,515 A | 11/1977 | Vidaurri, Jr. |
| 4,060,520 A | 11/1977 | Irvin |
| 4,064,114 A | 12/1977 | Edmonds, Jr. |
| 4,089,847 A | 5/1978 | Edmonds, Jr. et al. |
| 4,096,132 A | 6/1978 | Edmonds, Jr. |
| 4,368,321 A | 1/1983 | Sherk et al. |
| 4,370,470 A | 1/1983 | Vidaurri et al. |
| 4,393,197 A | 7/1983 | Edmonds, Jr. |
| 4,415,729 A | 11/1983 | Scoggins et al. |
| 4,451,640 A | 5/1984 | Shiiki et al. |
| 4,495,332 A | 1/1985 | Shiiki et al. |
| 4,500,706 A | 2/1985 | Mathis et al. |
| 4,501,902 A | 2/1985 | Cleary |
| 4,514,558 A | 4/1985 | Shiiki et al. |
| 4,535,117 A | 8/1985 | Mathis et al. |
| 4,537,953 A | 8/1985 | Kawakami et al. |
| 4,613,654 A | 9/1986 | Katto et al. |
| 4,645,826 A | 2/1987 | Iizuka et al. |
| 4,699,975 A | 10/1987 | Katto et al. |
| 4,734,484 A | 3/1988 | Alfes et al. |
| 4,740,569 A | 4/1988 | Tieszen et al. |
| 4,745,167 A | 5/1988 | Iizuka et al. |
| 4,748,231 A | 5/1988 | Nesheiwat |
| 4,767,841 A | 8/1988 | Goetz et al. |
| 4,769,442 A | 9/1988 | Iwasaki et al. |
| 4,786,711 A | 11/1988 | Senatore et al. |
| 4,794,164 A | 12/1988 | Iwasaki et al. |
| 4,795,671 A | 1/1989 | Shiiki et al. |
| 4,812,539 A | 3/1989 | Iizuka et al. |
| 4,814,430 A | 3/1989 | Iwasaki et al. |
| 4,820,800 A | 4/1989 | Geibel et al. |
| 4,820,801 A | 4/1989 | Inoue et al. |
| 4,841,019 A | 6/1989 | Iwasaki et al. |
| 4,931,516 A | 6/1990 | Iizuka et al. |
| 4,960,861 A | 10/1990 | Kotera et al. |
| 4,976,825 A | 12/1990 | Iwasaki et al. |
| 5,008,368 A | 4/1991 | Nesheiwat |
| 5,015,725 A | 5/1991 | Scoggins et al. |
| 5,023,315 A | 6/1991 | Ceurvorst et al. |
| 5,037,954 A | 8/1991 | Nesheiwat et al. |
| 5,053,486 A | 10/1991 | Nesheiwat |
| 5,071,944 A | 12/1991 | Cliffton et al. |
| 5,077,374 A | 12/1991 | Cleary |
| 5,086,163 A | 2/1992 | Scoggins et al. |
| 5,089,596 A | 2/1992 | Clifton et al. |
| 5,089,597 A | 2/1992 | Nesheiwat et al. |
| 5,093,468 A | 3/1992 | Kohler |
| 5,110,902 A | 5/1992 | Scoggins et al. |
| 5,126,430 A | 6/1992 | Senga et al. |
| 5,128,445 A | 7/1992 | Scoggins et al. |
| 5,134,224 A | 7/1992 | Nesheiwat et al. |
| 5,145,946 A | 9/1992 | Fujii et al. |
| 5,155,207 A | 10/1992 | Senatore et al. |
| 5,179,194 A | 1/1993 | Kawakami et al. |
| 5,194,580 A | 3/1993 | Koyama et al. |
| 5,235,032 A | 8/1993 | Geibel et al. |

(Continued)

FOREIGN PATENT DOCUMENTS

EP  1 837 359  9/2007
JP  S5829822  2/1983
(Continued)

OTHER PUBLICATIONS

Machine translation of JP2014028917.
(Continued)

Primary Examiner — Christopher M Rodd
(74) Attorney, Agent, or Firm — Dority & Manning, P.A.

(57) ABSTRACT

A method for forming a polyarylene sulfide with a relatively low content of volatile malodorous compounds is provided. More particularly, such low compound levels may be achieved by subjecting a washed polyarylene sulfide to a heat treatment in the presence of an atmosphere that includes an inert gas, wherein the heat treatment occurs at a temperature of from about 150° C. to about 275° C.

22 Claims, 1 Drawing Sheet

(56) References Cited

U.S. PATENT DOCUMENTS

| | | |
|---|---|---|
| 5,241,043 A | 8/1993 | Senga |
| 5,266,680 A | 11/1993 | Reed |
| 5,278,283 A | 1/1994 | Miyoshi et al. |
| 5,280,104 A | 1/1994 | Geibel et al. |
| 5,296,579 A | 3/1994 | Geibel et al. |
| 5,314,972 A | 5/1994 | Nesheiwat et al. |
| 5,328,980 A | 7/1994 | Decker et al. |
| 5,334,701 A | 8/1994 | Ash et al. |
| 5,342,920 A | 8/1994 | Imai et al. |
| 5,350,833 A | 9/1994 | Inoue et al. |
| 5,352,768 A | 10/1994 | Stuber et al. |
| 5,354,841 A | 10/1994 | Geibel et al. |
| 5,364,928 A | 11/1994 | Ash |
| 5,438,115 A | 8/1995 | Fahey et al. |
| 5,440,009 A | 8/1995 | Ash et al. |
| 5,475,081 A | 12/1995 | Imai et al. |
| 5,618,981 A | 4/1997 | Shaw |
| 5,635,587 A | 6/1997 | Koyama et al. |
| 5,688,908 A | 11/1997 | Haubs et al. |
| 5,696,282 A | 12/1997 | Shaw et al. |
| 5,744,576 A | 4/1998 | Miyahara et al. |
| 5,756,654 A | 5/1998 | Sase et al. |
| 5,777,069 A | 7/1998 | Tsuda et al. |
| 5,780,583 A | 7/1998 | Lubowitz et al. |
| 5,786,422 A * | 7/1998 | Mizutani ............ C08G 75/0222 525/189 |
| 5,789,533 A | 8/1998 | Yamanaka et al. |
| 5,804,076 A | 9/1998 | Yamasaki et al. |
| 5,840,830 A | 11/1998 | Miyahara et al. |
| 5,856,433 A | 1/1999 | Koyama et al. |
| 5,894,072 A | 4/1999 | Haubs et al. |
| 5,898,061 A | 4/1999 | Sase et al. |
| 5,905,137 A | 5/1999 | Haubs et al. |
| 5,929,203 A | 7/1999 | Ash et al. |
| 6,201,097 B1 | 3/2001 | Geibel et al. |
| 6,201,098 B1 | 3/2001 | Haubs et al. |
| 6,242,501 B1 | 6/2001 | Green et al. |
| 6,281,326 B1 | 8/2001 | Ash et al. |
| 6,331,608 B1 | 12/2001 | Vidaurri et al. |
| 6,337,062 B1 | 1/2002 | Akiba |
| 6,350,852 B1 | 2/2002 | Haubs et al. |
| 6,388,003 B1 | 5/2002 | Okamoto et al. |
| 6,538,102 B1 | 3/2003 | Haubs et al. |
| 6,562,900 B2 | 5/2003 | Okamoto et al. |
| 6,566,488 B2 | 5/2003 | Okamoto et al. |
| 6,600,009 B2 | 7/2003 | Inoue et al. |
| 6,646,105 B2 | 11/2003 | Shirota |
| 6,734,282 B1 | 5/2004 | Wagener et al. |
| 6,743,890 B2 | 6/2004 | Bando |
| 6,750,319 B2 | 6/2004 | Koyama |
| 6,818,132 B2 | 11/2004 | Haubs et al. |
| 6,939,942 B2 | 9/2005 | Shirota |
| 6,982,312 B2 | 1/2006 | Senga et al. |
| 7,018,574 B2 | 3/2006 | Koyama |
| 7,026,439 B2 | 4/2006 | Senga et al. |
| 7,094,867 B2 | 8/2006 | Miyahara et al. |
| 7,115,704 B2 | 10/2006 | Horiuchi et al. |
| 7,220,817 B2 | 5/2007 | Matsuzaki et al. |
| 7,312,300 B2 | 12/2007 | Mitchell |
| 7,317,072 B2 | 1/2008 | Senga et al. |
| 7,432,339 B2 | 10/2008 | Mitchell |
| 7,501,111 B2 | 3/2009 | Keller et al. |
| 7,504,476 B2 | 3/2009 | Kawama et al. |
| 7,517,946 B2 | 4/2009 | Sato et al. |
| 7,569,656 B2 | 8/2009 | Kagoshima et al. |
| 7,632,915 B2 | 12/2009 | Sato et al. |
| 7,655,748 B2 | 2/2010 | Sato et al. |
| 7,750,111 B2 | 7/2010 | Horiuchi et al. |
| 7,754,795 B2 | 7/2010 | Hintzer et al. |
| 7,754,848 B2 | 7/2010 | Sato et al. |
| 7,767,783 B2 | 8/2010 | Kawama et al. |
| 7,834,133 B2 | 11/2010 | Suzuki et al. |
| 8,044,142 B2 | 10/2011 | Akiyama et al. |
| 8,076,423 B2 | 12/2011 | Ishio et al. |
| 8,076,447 B2 | 12/2011 | Sato et al. |
| 8,138,302 B2 | 3/2012 | Sato et al. |
| 8,183,336 B2 | 5/2012 | Sato et al. |
| 8,211,997 B2 | 7/2012 | Matsuzaki et al. |
| 8,263,734 B2 | 9/2012 | Fodor et al. |
| 8,329,832 B2 | 12/2012 | Horiuchi et al. |
| 8,426,552 B2 | 4/2013 | Hinokimori et al. |
| 8,440,784 B2 | 5/2013 | Kaiho et al. |
| 8,445,629 B2 | 5/2013 | Hinokimori et al. |
| 8,530,605 B2 | 9/2013 | Konno et al. |
| 8,546,518 B2 | 10/2013 | Unohara et al. |
| 8,609,790 B2 | 12/2013 | Suzuki et al. |
| 8,680,230 B2 | 3/2014 | Konno et al. |
| 8,846,857 B2 | 9/2014 | Duff et al. |
| 8,883,959 B2 | 11/2014 | Hinokimori |
| 8,921,513 B2 | 12/2014 | Luo et al. |
| 8,981,041 B2 | 3/2015 | Kimura et al. |
| 9,068,047 B2 | 6/2015 | Ichinose et al. |
| 9,074,048 B2 | 7/2015 | Kim et al. |
| 9,096,723 B2 | 8/2015 | Ichinose et al. |
| 9,187,641 B2 | 11/2015 | Ouchiyama et al. |
| 9,255,350 B2 | 2/2016 | Taniguchi et al. |
| 9,339,778 B2 | 5/2016 | Koizumi et al. |
| 9,388,283 B2 | 7/2016 | Chiong et al. |
| 9,403,948 B2 | 8/2016 | Chiong et al. |
| 9,422,400 B2 | 8/2016 | Konno et al. |
| 9,422,402 B2 | 8/2016 | Suzuki et al. |
| 9,562,139 B2 | 2/2017 | Chiong |
| 9,587,074 B2 | 3/2017 | Chiong et al. |
| 9,604,156 B2 | 3/2017 | Nekkanti et al. |
| 9,617,387 B2 | 4/2017 | Chiong |
| 9,809,681 B2 | 11/2017 | Nekkanti et al. |
| 9,815,942 B2 | 11/2017 | Chiong |
| 9,868,824 B2 | 1/2018 | Chiong et al. |
| 9,890,222 B2 | 2/2018 | Yokoyama et al. |
| 9,896,548 B2 | 2/2018 | Suzuki et al. |
| 9,908,974 B2 | 3/2018 | Kobayashi et al. |
| 9,938,379 B2 | 4/2018 | Chiong et al. |
| 9,988,494 B2 | 6/2018 | Chiong |
| 10,010,857 B2 | 7/2018 | Kobayashi et al. |
| 10,072,123 B2 | 9/2018 | Konno et al. |
| 10,106,654 B2 | 10/2018 | Chiong |
| 10,196,486 B2 | 2/2019 | Miyahara et al. |
| 10,196,487 B2 | 2/2019 | Suzuki et al. |
| 10,280,264 B2 | 5/2019 | Konno et al. |
| 10,407,551 B2 | 9/2019 | Suzuki et al. |
| 10,501,582 B2 | 12/2019 | Konno et al. |
| 10,556,992 B2 | 2/2020 | Miyahara et al. |
| 10,570,255 B2 | 2/2020 | Mokudai et al. |
| 10,647,817 B2 | 5/2020 | Konno et al. |
| 10,647,818 B2 | 5/2020 | Konno et al. |
| 10,731,005 B2 | 8/2020 | Konno et al. |
| 10,882,959 B2 | 1/2021 | Chiong |
| 2004/0164443 A1 | 8/2004 | Koyanna |
| 2005/0171332 A1 | 8/2005 | Koyama |
| 2009/0142566 A1 * | 6/2009 | Machida ............ H04R 31/003 428/220 |
| 2010/0163499 A1 | 7/2010 | Odueyungbo |
| 2011/0319587 A1 | 12/2011 | Hinokimori |
| 2013/0068256 A1 | 3/2013 | Kobayashi et al. |
| 2013/0317159 A1 | 11/2013 | Geibel et al. |
| 2015/0175748 A1 | 6/2015 | Fodor et al. |
| 2016/0237216 A1 | 8/2016 | Konno et al. |
| 2016/0244569 A1 * | 8/2016 | Chiong ............ C08G 75/0204 |
| 2017/0107329 A1 | 4/2017 | Konno et al. |
| 2018/0171078 A1 | 6/2018 | Kimura et al. |
| 2018/0171079 A1 | 6/2018 | Miyahara et al. |
| 2020/0407509 A1 | 12/2020 | Chiong |

FOREIGN PATENT DOCUMENTS

| | | |
|---|---|---|
| JP | S5847026 | 3/1983 |
| JP | S58125721 | 7/1983 |
| JP | S59168032 | 9/1984 |
| JP | S6055029 | 3/1985 |
| JP | S60235838 | 11/1985 |
| JP | S61228023 | 10/1986 |
| JP | S62285922 | 12/1987 |
| JP | H0280432 | 3/1990 |

(56) References Cited

FOREIGN PATENT DOCUMENTS

| | | |
|---|---|---|
| JP | H02160834 | 6/1990 |
| JP | H02302436 | 12/1990 |
| JP | H05271414 | 10/1993 |
| JP | H06145355 | 5/1994 |
| JP | H0649762 | 6/1994 |
| JP | H07118389 | 5/1995 |
| JP | H07228699 | 8/1995 |
| JP | H07242746 | 9/1995 |
| JP | H07292107 | 11/1995 |
| JP | H07330911 | 12/1995 |
| JP | H0841201 | 2/1996 |
| JP | H08100064 | 4/1996 |
| JP | H08134216 | 5/1996 |
| JP | H08151443 | 6/1996 |
| JP | H08157600 | 6/1996 |
| JP | H08157718 | 6/1996 |
| JP | H08170016 | 7/1996 |
| JP | H08170017 | 7/1996 |
| JP | H08176302 | 7/1996 |
| JP | H08193130 | 7/1996 |
| JP | H08193131 | 7/1996 |
| JP | H08198965 | 8/1996 |
| JP | H08198966 | 8/1996 |
| JP | H08198967 | 8/1996 |
| JP | H08231722 | 9/1996 |
| JP | H08231723 | 9/1996 |
| JP | H08239474 | 9/1996 |
| JP | 2543673 | 10/1996 |
| JP | H08253587 | 10/1996 |
| JP | H08269199 | 10/1996 |
| JP | H08269200 | 10/1996 |
| JP | H08283413 | 10/1996 |
| JP | H08319348 | 12/1996 |
| JP | H09104816 | 4/1997 |
| JP | H09124940 | 5/1997 |
| JP | H09194726 | 7/1997 |
| JP | H09296042 | 11/1997 |
| JP | H107798 | 1/1998 |
| JP | H1045911 | 2/1998 |
| JP | H1045912 | 2/1998 |
| JP | H1060113 | 3/1998 |
| JP | H10110034 | 4/1998 |
| JP | H10158399 | 6/1998 |
| JP | H10195197 | 7/1998 |
| JP | H10245434 | 9/1998 |
| JP | H1180355 | 3/1999 |
| JP | H11169870 | 6/1999 |
| JP | H11349566 | 12/1999 |
| JP | 2000136246 | 5/2000 |
| JP | 2000191785 | 7/2000 |
| JP | 2000239383 | 9/2000 |
| JP | 2001040090 | 2/2001 |
| JP | 2001172387 | 6/2001 |
| JP | 2001181394 | 7/2001 |
| JP | 2002187949 | 7/2002 |
| JP | 2002201274 | 7/2002 |
| JP | 2002201275 | 7/2002 |
| JP | 2002212292 | 7/2002 |
| JP | 2003026803 | 1/2003 |
| JP | 2003275773 | 9/2003 |
| JP | 2004107567 | 4/2004 |
| JP | 2004182753 | 7/2004 |
| JP | 2004352923 | 12/2004 |
| JP | 2005041922 | 2/2005 |
| JP | 2005047953 | 2/2005 |
| JP | 2005264030 | 9/2005 |
| JP | 2005344045 | 12/2005 |
| JP | 2006016567 | 1/2006 |
| JP | WO 2006/068159 A1 | 6/2006 |
| JP | 2007077209 | 3/2007 |
| JP | 2007314803 | 12/2007 |
| JP | 2008075055 | 4/2008 |
| JP | 2008239767 | 10/2008 |
| JP | 2008248153 | 10/2008 |
| JP | 2008248154 | 10/2008 |
| JP | 4256506 | 4/2009 |
| JP | 2009185143 | 8/2009 |
| JP | 2010037518 | 2/2010 |
| JP | 2010126621 | 6/2010 |
| JP | 4994997 | 8/2012 |
| JP | 2013023586 | 2/2013 |
| JP | 2016108488 A | 6/2016 |
| JP | 2016183269 A | 10/2016 |
| WO | WO 2016/104381 A1 | 6/2016 |

OTHER PUBLICATIONS

International Search Report and Written Opinion for PCT/US2020/063202 dated Mar. 11, 2021, 8 pages.
Fahey et al., Poly(p-phenylene sulfide) Synthesis: A Step-Growth Polymerization with Unequal Step Reactivity, *Macromolecules* 1997, pp. 387-393, 7 pages.

\* cited by examiner

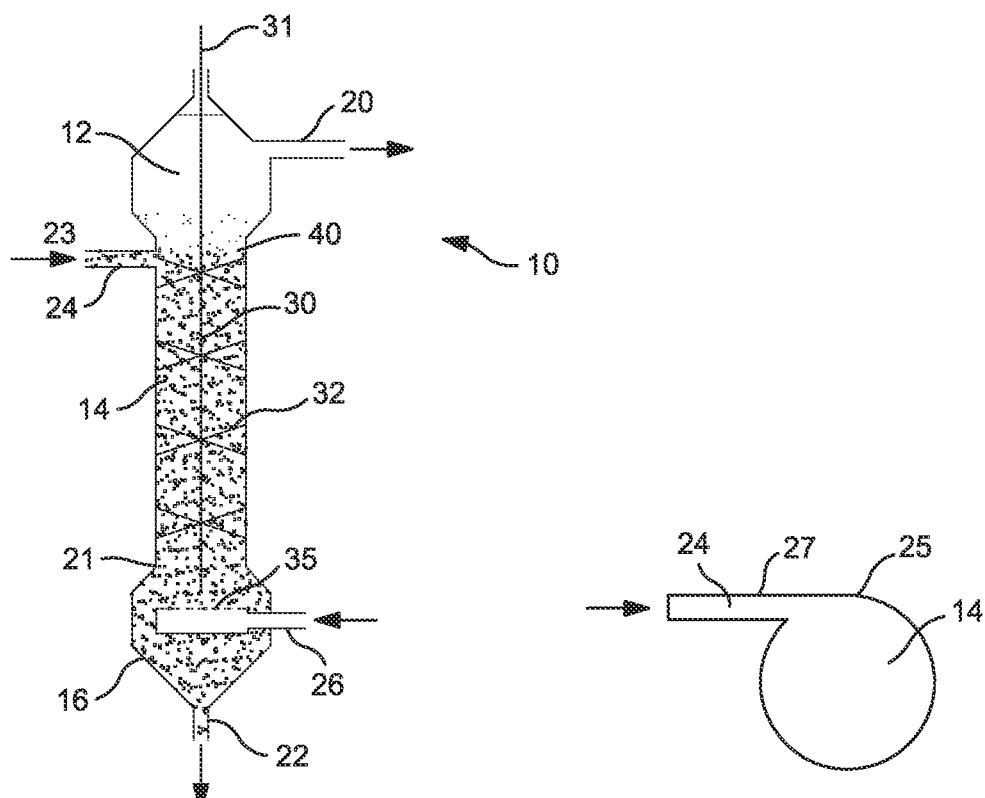
FIG. 1
FIG. 2
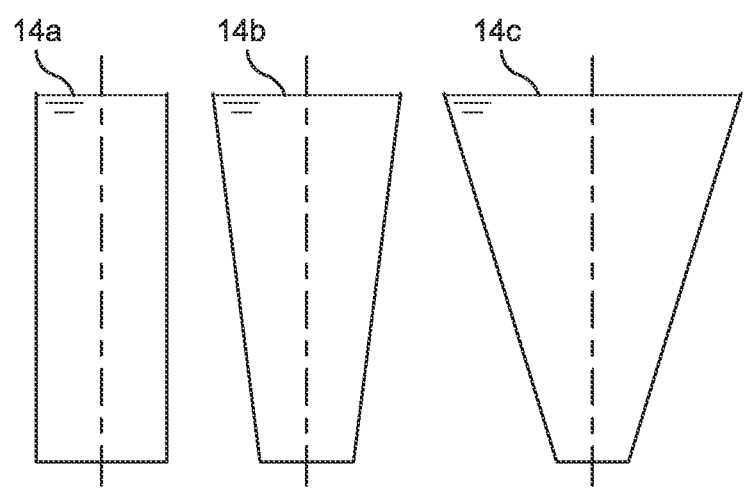
FIG. 3

METHOD FOR FORMING A POLYARYLENE SULFIDE

RELATED APPLICATION

The present application claims priority to U.S. Provisional Application Ser. No. 62/951,096, filed on Dec. 20, 2019, which is incorporated herein in its entirety by reference thereto.

BACKGROUND OF THE INVENTION

Polyarylene sulfides are high-performance polymers that may withstand high thermal, chemical, and mechanical stresses and are beneficially utilized in a wide variety of applications. Polyarylene sulfides are generally formed via polymerization of a dihaloaromatic monomer with an alkali metal sulfide or an alkali metal hydrosulfide in an organic amide solvent. Following formation, the polyarylene sulfide is washed to separate the polymer from the solvent, unreacted monomers, and other impurities. Many conventional washing solutions rely on the use of acetone to quickly remove the reaction solvent and a substantial portion of partially polymerized oligomers from the polyarylene sulfide. Unfortunately, polyarylene sulfides that are washed with such solutions tend to contain residual amounts of certain malodorous compounds, such as mesityl oxide ("MO"), mercapto-4-methylpentan-2-one ("MMP"), and/or butyrolactone ("BL"), which are formed when acetone and NMP are contacted. As such, a need currently exists for polyarylene sulfide with a low level of malodorous compounds and for improved processes for forming polyarylene sulfides.

SUMMARY OF THE INVENTION

In accordance with one embodiment of the present invention, a method for forming a polyarylene sulfide is disclosed. The method comprises subjecting a polyarylene sulfide to a washing cycle to form a washed polyarylene sulfide, and thereafter subjecting the washed polyarylene sulfide to a heat treatment in the presence of an atmosphere that includes an inert gas. The heat treatment occurs at a temperature of from about 150° C. to about 275° C.

Other features and aspects of the present invention are set forth in greater detail below.

BRIEF DESCRIPTION OF THE FIGURES

The present disclosure may be better understood with reference to the following figures:

FIG. 1 illustrates one embodiment of a sedimentation column that may be employed in the present invention;

FIG. 2 illustrates a cross-sectional top view of the middle section of the sedimentation column of FIG. 1 at the slurry inlet; and FIG. 3 illustrates several different embodiments of longitudinal cross-sectional shapes of a middle section of a sedimentation column that may be employed in the present invention.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to a method for forming a polyarylene sulfide with a relatively low content of volatile compounds, which specifically includes mesityl oxide ("MO"), mercapto-4-methylpentan-2-one ("MMP"), butyrolactone ("BL"), diacetone alcohol ("DAA"), thiophenol ("PhSH"), p-dichlorobenzene ("pDCB"), methylthiophenol ("MeSPh"), and/or N-methylpyrrolidone ("NMP"). More particularly, the polyarylene sulfide of the present invention may have a total volatile content of about 175 parts per million ("ppm") or less, in some embodiments about 100 ppm or less, and in some embodiments, from 0 to about 70 ppm. Such compounds may either have an unpleasant odor or are precursors to other compounds that have an unpleasant odor. For instance, the polyarylene sulfide may have an MMP content of about 75 ppm or less, in some embodiments about 60 ppm or less, in some embodiments about 50 ppm or less, and in some embodiments, from 0 to about 25 ppm. The polyarylene sulfide may have an MO content of about 75 ppm or less, in some embodiments about 60 ppm or less, in some embodiments about 50 ppm or less, and in some embodiments, from 0 to about 25 ppm. The polyarylene sulfide may also have a BL content of about 65 ppm or less, in some embodiments about 55 ppm or less, in some embodiments about 40 ppm or less, and in some embodiments, from 0 to about 35 ppm. Likewise, the polyarylene sulfide may an NMP content of about 20 ppm or less, in some embodiments about 15 ppm or less, and in some embodiments, from 0 to about 10 ppm, as well as a pDCB content of about 4 ppm or less, in some embodiments about 3.5 ppm or less, and in some embodiments, from 0 to about 3 ppm. The present inventor has discovered that such low volatile levels may be achieved by selectively controlling the manner in which the polyarylene sulfide is processed after it is washed.

More particularly, the process includes subjecting the polyarylene sulfide to a heat treatment at a relatively high temperature of from about 150° C. to about 275° C., in some embodiments from about 180° C. to about 270° C., and in some embodiments, from about 225° C. to about 265° C. The heat treatment may occur in one or multiple steps and may be ramped up to the temperature noted above, or simply held constant at the desired temperature during the entire treatment. Regardless, the duration of the heat treatment is typically from about 0.1 to about 15 hours, in some embodiments from about 0.5 to about 10 hours, and in some embodiments, from about 1 to about 5 hours. The heat treatment also typically occurs at or near atmospheric pressure, such as at a pressure of about 0.6 to about 1.2 atm, and in some embodiments, from about 0.8 to about 1.2 atm.

To help ensure that the heat treatment does not adversely impact the color of the polyarylene sulfide, the heat treatment is generally conducted in the presence of an inert gas. The inert gas may include, for instance, nitrogen, helium, argon, xenon, neon, krypton, radon, and so forth, as well as mixtures thereof. Typically, inert gases constitute the substantial majority of the atmosphere within the housing, such as from about 50 wt. % to 100 wt. %, in some embodiments from about 75 wt. % to 100 wt. %, and in some embodiments, from about 90 wt. % to 100 wt. % of the atmosphere (e.g., 100 wt. %). If desired, a relatively small amount of non-inert gases may also be employed, such as carbon dioxide, oxygen, water vapor, etc. In such cases, however, the non-inert gases typically constitute 10 wt. % or less, in some embodiments 5 wt. % or less, in some embodiments about 2 wt. % or less, in some embodiments about 1 wt. % or less, and in some embodiments, from about 0.01 wt. % to about 1 wt. % of the atmosphere. The resulting Yellowness Index of the polyarylene sulfide after heat treatment may remain relatively low, such as about 25 or less, in some embodiments about 15 or less, in some embodiments about 10 or less, and in some embodiments, from about 0.1 to about 9.5, as determined in accordance with ASTM E313-15 (illuminant D65, 10 degree observer). The purity of the resulting polyarylene sulfide may likewise be relatively high, such as about 90% or more, in some embodiments about 95% or more, and in some embodiments, or about 98% or more.

Through the process described above, the present inventor has also discovered that the polyarylene sulfide can retain a relatively high oligomer content, which in turn, helps minimize the melt viscosity. The oligomer content may, for instance, range from about 0.5 wt. % to about 2 wt. %, in some embodiments from about 0.8 wt. % to about 1.8 wt. %, and in some embodiments, from about 1.2 wt. % to about 1.6 wt. %. The polyarylene sulfide may likewise have a melt viscosity of about 4,000 poise or less, in some embodiments about 2,500 poise or less, and in some embodiments, from about 100 to about 2,000 poise, as determined in accordance with ISO Test No. 11443:2005 at a shear rate of 1,200 s$^{-1}$ and at a temperature of 310° C. In addition, the crystallization temperature of the polyarylene sulfide may also remain relatively low, such as about 240° C. or less, in some embodiments about 230° C. or less, and in some embodiments, from about 180° C. to about 225° C. The weight average molecular weight of the polyarylene sulfide may also be from about 10,000 to about 120,000 Daltons, in some embodiments about 15,000 Daltons to about 110,000 Daltons, and in some embodiments, from about 20,000 to about 100,000 Daltons. The polydispersity index (weight average molecular weight divided by the number average molecular weight) may be relatively low, thus resulting in a polymer that is more readily formed into particles with a narrow particle size distribution. For instance, the polydispersity index of the polyarylene sulfide may be about 4.3 or less, in some embodiments about 4.1 or less, and in some embodiments, from about 2.0 to about 4.0. The number average molecular weight of the polyarylene sulfide may, for instance, be from about 5,000 about 80,000 Daltons, in some embodiments about 10,000 Daltons to about 70,000 Daltons, and in some embodiments, from about 20,000 to about 60,000 Daltons.

Various embodiments of the present invention will now be described in more detail below.

I. Polyarylene Sulfide

The polyarylene sulfide generally has repeating units of the formula:

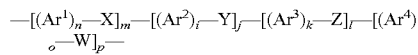

wherein,

Ar$^1$, Ar$^2$, Ar$^3$, and Ar$^4$ are independently arylene units of 6 to 18 carbon atoms;

W, X, Y, and Z are independently bivalent linking groups selected from —SO$_2$—, —S—, —SO—, —CO—, —O—, —C(O)O— or alkylene or alkylidene groups of 1 to 6 carbon atoms, wherein at least one of the linking groups is —S—; and n, m, i, j, k, l, o, and p are independently 0, 1, 2, 3, or 4, subject to the proviso that their sum total is not less than 2.

The arylene units Ar$^1$, Ar$^2$, Ar$^3$, and Ar$^4$ may be selectively substituted or unsubstituted. Advantageous arylene units are phenylene, biphenylene, naphthylene, anthracene and phenanthrene. The polyarylene sulfide typically includes more than about 30 mol %, more than about 50 mol %, or more than about 70 mol % arylene sulfide (—S—) units. For example, the polyarylene sulfide may include at least 85 mol % sulfide linkages attached directly to two aromatic rings. In one particular embodiment, the polyarylene sulfide is a polyphenylene sulfide, defined herein as containing the phenylene sulfide structure —(C$_6$H$_4$—S)$_n$— (wherein n is an integer of 1 or more) as a component thereof.

The polyarylene sulfide may be a homopolymer or copolymer. For instance, selective combination of dihaloaromatic compounds may result in a polyarylene sulfide copolymer containing not less than two different units. For instance, when p-dichlorobenzene is used in combination with m-dichlorobenzene or 4,4'-dichlorodiphenylsulfone, a polyarylene sulfide copolymer may be formed containing segments having the structure of formula:

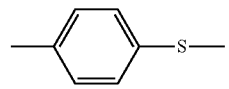

and segments having the structure of formula:

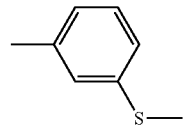

or segments having the structure of formula:

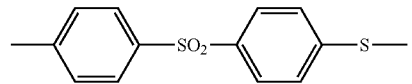

The polyarylene sulfide(s) may be linear, semi-linear, branched or crosslinked. Linear polyarylene sulfides typically contain 80 mol % or more of the repeating unit —(Ar—S)—. Such linear polymers may also include a small amount of a branching unit or a cross-linking unit, but the amount of branching or cross-linking units is typically less than about 1 mol % of the total monomer units of the polyarylene sulfide. A linear polyarylene sulfide polymer may be a random copolymer or a block copolymer containing the above-mentioned repeating unit. Semi-linear polyarylene sulfides may likewise have a cross-linking structure or a branched structure introduced into the polymer a small amount of one or more monomers having three or more reactive functional groups.

Various techniques may generally be employed to synthesize the polyarylene sulfide. By way of example, a process for producing a polyarylene sulfide may include reacting a material that provides a hydrosulfide ion (e.g., an alkali metal sulfide) with a dihaloaromatic compound in an organic amide solvent. The alkali metal sulfide may be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide may be processed according to a dehydrating operation in advance of the polymerization reaction. An alkali metal sulfide may also be generated in situ. In addition, a small amount of an alkali metal hydroxide may be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound may be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds may include, without limitation, p-dichlorobenzene; m-dichlorobenzene; o-dichlorobenzene; 2,5-dichlorotoluene; 1,4-dibromobenzene, 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone. The halogen atom may be fluorine, chlorine, bromine or iodine, and two halogen atoms in the same dihalo-aromatic compound may be the same or different from each other. In one embodiment, o-dichlorobenzene, m-dichlorobenzene, p-dichlorobenzene or a mixture of two or more compounds thereof is used as the dihaloaromatic compound. As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

Although by no means required, the polyarylene sulfide can, in certain embodiments be formed in a multi-stage process that includes at least two separate formation stages. One stage of the formation process may include reaction of a complex that includes a hydrolysis product of an organic amide solvent and alkali metal hydrogen sulfide with a dihaloaromatic monomer to form a prepolymer. Another stage of the process may include further polymerization of the prepolymer to form the final product. Optionally, the process may include yet another stage in which the organic amide solvent and an alkali metal sulfide are reacted to form the complex. The different stages may take place in a single reactor or in separate reactors.

In one embodiment, for instance, a multi-stage process may be employed in which a first stage of the process includes the reaction of an organic amide solvent and an alkali metal sulfide within a reactor to form a complex that includes a hydrolysis product of the organic amide solvent (e.g., an alkali metal organic amine carboxylic acid salt) and an alkali metal hydrosulfide. Exemplary organic amide solvents as may be used in a forming the polyarylene sulfide may include, without limitation, N-methyl-2-pyrrolidone; N-ethyl-2-pyrrolidone; N,N-dimethylformamide, N,N-dimethylacetamide, N-methylcaprolactam, tetramethylurea; dimethylimidazolidinone; hexamethyl phosphoric acid triamide and mixtures thereof. The alkali metal sulfide may be, for example, lithium sulfide, sodium sulfide, potassium sulfide, rubidium sulfide, cesium sulfide or a mixture thereof. An alkali metal sulfide may also be generated in situ. For instance, a sodium sulfide hydrate may be prepared within the first reactor from sodium hydrogen sulfide and sodium hydroxide that may be fed to the reactor. When a combination of alkali metal hydrogen sulfide and alkali metal hydroxide are fed to the reactor to form the alkali metal sulfide, the molar ratio of alkali metal hydroxide to alkali metal hydrogen sulfide may be between about 0.80 and about 1.50. In addition, a small amount of an alkali metal hydroxide may be included in the first reactor to remove or react impurities (e.g., to change such impurities to harmless materials) such as an alkali metal polysulfide or an alkali metal thiosulfate, which may be present in a very small amount with the alkali metal sulfide.

The feed to the reactor may include sodium sulfide ($Na_2S$) (which may be in the hydrate form), N-methyl-2-pyrrolidone (NMP) and water. Reaction between the water, sodium sulfide and the NMP may form a complex including sodium methylaminobutyrate (SMAB—a hydrolysis product of NMP) and sodium hydrogen sulfide (NaSH) (SMAB-NaSH) according to the following reaction scheme:

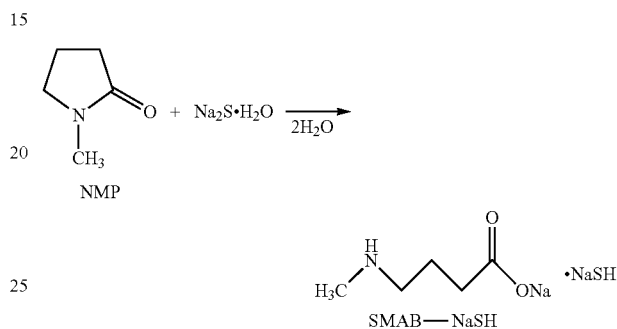

According to one embodiment, a stoichiometric excess of the alkali metal sulfide may be utilized, though this is not a requirement of the formation stage. For instance, the molar ratio of organic amide solvent to sulfur in the feed may be from 2 to about 10, or from about 3 to about 5, and the molar ratio of water to the sulfur source in the feed may be from about 0.5 to about 4, or from about 1.5 to about 3.

During the formation of the complex, the pressure within the reactor may be held at or near atmospheric pressure. To maintain the low pressure reaction conditions, vapor may be removed from the reactor. The main constituents of the vapor may include water and hydrogen sulfide by-product. Hydrogen sulfide of the vapor can, for instance, be separated at a condenser. A portion of the water that is separated at such a condenser may be returned to the reactor to maintain the reaction conditions. Another portion of the water may be removed from the process so as to dehydrate the SMAB-NaSH solution formed in the first stage. For instance, the molar ratio of water to NaSH (or the ratio of oxygen to sulfur) in the product solution of the first reactor may less than about 1.5, or may be between about 0.1 and about 1 such that the SMAB-NaSH complex solution that is fed to the second stage reactor is near-anhydrous.

Once formed, the SMAB-NaSH complex may then be reacted with a dihaloaromatic monomer (e.g., p-dichlorobenzene) and a suitable solvent so as to form the polyarylene sulfide prepolymer in the second stage of the process. This may occur in the same or a different reactor as the first stage of the process. The amount of the dihaloaromatic monomer(s) per mole of the effective amount of the charged alkali metal sulfide may generally be from about 1.0 to about 2.0 moles, in some embodiments from about 1.05 to about 2.0 moles, and in some embodiments, from about 1.1 to about 1.7 moles. If desired, a relatively low molar ratio of the dihaloaromatic monomer to the alkali metal hydrogen sulfide of the complex may be employed. For instance, the ratio of the dihaloaromatic monomer to sulfur may be from about 0.8 to about 1.5, and in some embodiments, from about 1.0 to about 1.2. The relatively low ratio of the dihaloaromatic monomer to the alkali metal hydrogen sulfide of the complex may be favorable for the formation of the final high molecular weight polymer via the condensation polymerization reaction. The ratio of solvent to sulfur in the second stage may also be relatively low. For instance, the ratio of the alkali metal hydrogen sulfide of the complex to the organic amide solvent in the second stage (including any solvent added and remaining in the complex solution) may be from about 2 to about 2.5. This relatively low ratio may increase the concentration of reactants, which may increase the relative polymerization rate and the per volume polymer production rate.

The second stage polymerization reaction may generally be carried out at a temperature of from about 200° C. to about 280° C., or from about 235° C. to about 260° C. The duration of the second stage may be, e.g., from about 0.5 to about 15 hours, or from about 1 to about 5 hours. Following the second stage polymerization reaction, the mean molar mass of the prepolymer as expressed by the weight average molecular weight, $M_w$, may be from about 500 g/mol to about 30,000 g/mol, from about 1000 g/mol to about 20,000 g/mol, or from about 2000 g/mol to about 15,000 g/mol.

The product of the second stage may include the prepolymer, the solvent, and one or more salts that are formed as a by-product of the polymerization reaction. For example, the proportion by volume of the prepolymer solution of salt that is formed as a byproduct to the reaction may be from about 0.05 to about 0.25, or from about 0.1 to about 0.2. Salts included in the reaction mixture may include those formed as a byproduct during the reaction as well as other salts added to the reaction mixture, for instance as a reaction promoter. The salts may be organic or inorganic, i.e., may consist of any combination of organic or inorganic cations with organic or inorganic anions. They may be at least partially insoluble in the reaction medium and have a density different from that of the liquid reaction mixture. According to one embodiment, at least a portion of the salts in the prepolymer mixture formed during the second stage may be removed from the mixture. For instance, the salts may be removed by use of screens or sieves as has been utilized in traditional separation processes. A salt/liquid extraction process may alternatively or additionally be utilized in separating the salt from the prepolymer solution. In one embodiment, a hot filtration process may be utilized in which the solution may be filtered at a temperature at which the prepolymer is in solution and the salts are in the solid phase. According to one embodiment, a salt separation process may remove about 95% or more of the salts including in the prepolymer solution formed during the second stage. For instance, greater than about 99% of the salts may be removed from the prepolymer solution.

Following the prepolymer polymerization reaction in the second stage of the process and the filtration process, an optional third stage of the formation may take place during which the molecular weight of the prepolymer is increased. Again, this stage may occur in the same or a different reactor from the first and second stages. The reactants employed during this stage may include the prepolymer solution from the second stage, solvent, one or more dihaloaromatic monomers, and a sulfur-containing monomer. For instance, the amount of the sulfur-containing monomer added in third stage may be about 10% or less of the total amount required to form the product polyarylene sulfide. In the illustrated embodiment, the sulfur-containing monomer is sodium sulfide, but this is not a requirement of the third stage, and other sulfur containing monomers, such as an alkali metal hydrogen sulfide monomer may alternatively be utilized.

The third reaction conditions may be nearly anhydrous, with the ratio of water to the sulfur-containing monomer less than about 0.2, for instance between 0 and about 0.2. The low water content during the third stage of the process may increase the polymerization rate and the polymer yield as well as reduce formation of undesired side reaction by-products as the conditions are favorable for nucleophilic aromatic substitution, as discussed above. Moreover, as pressure increases in the third stage are generally due to water vaporization, low water content during this stage may allow the third reaction to be carried out at a constant, relatively low pressure, for instance less than about 1500 kPa.

The reaction conditions during the third stage may also include a relatively low molar ratio for the solvent to the sulfur-containing monomer. For instance, the ratio of solvent to sulfur-containing monomer may be from about 2 to about 4, or from about 2.5 to about 3. The reaction mixture of the third stage may be heated to a temperature of from about 120° C. to about 280° C., or from about 200° C. to about 260° C. and the polymerization may continue until the melt viscosity of the thus formed polymer is raised to the desired final level. The duration of the second polymerization step may be, e.g., from about 0.5 to about 20 hours, or from about 1 to about 10 hours. The weight average molecular weight of the formed polyarylene sulfide may vary as is known, but in one embodiment may be from about 1000 g/mol to about 500,000 g/mol, from about 2,000 g/mol to about 300,000 g/mol, or from about 3,000 g/mol to about 100,000 g/mol. Following the third stage, and any desired post-formation processing, the polyarylene sulfide may be discharged from the reactor, typically through an extrusion orifice fitted with a die of desired configuration, cooled, and collected. Commonly, the polyarylene sulfide may be discharged through a perforated die to form strands that are taken up in a water bath, pelletized and dried. The polyarylene sulfide may also be in the form of a strand, granule, or powder.

II. Washing Cycle

Once formed, the polyarylene sulfide may be subjected to a washing cycle that contacting the polyarylene sulfide with a washing solution, which typically includes water and/or an organic solvent. When employed, the organic solvent is typically an aprotic solvent. Particularly suitable aprotic organic solvents include, for instance, halogen-containing solvents (e.g., methylene chloride, 1-chlorobutane, chlorobenzene, 1,1-dichloroethane, 1,2-dichloroethane, chloroform, and 1,1,2,2-tetrachloroethane); ether solvents (e.g., diethyl ether, tetrahydrofuran, and 1,4-dioxane), ketone solvents (e.g., acetone and cyclohexanone); ester solvents (e.g., ethyl acetate); lactone solvents (e.g., butyrolactone); carbonate solvents (e.g., ethylene carbonate and propylene carbonate); amine solvents (e.g., triethylamine and pyridine); nitrile solvents (e.g., acetonitrile and succinonitrile); amide solvents (e.g., N,N'-dimethylformamide, N,N'-dimethylacetamide, tetramethylurea and N-methylpyrrolidone); nitro-containing solvents (e.g., nitromethane and nitrobenzene); sulfide solvents (e.g., dimethylsulfoxide and sulfolane); and so forth. Of, course, other types of organic solvents may also be employed. In certain embodiments, for instance, protic solvents may be employed, such as glycols (e.g., propylene glycol, butylene glycol, triethylene glycol, hexylene glycol, polyethylene glycols, ethoxydiglycol, and dipropyleneglycol); carboxylic acids (e.g., formic acid); alcohols (e.g., methanol, ethanol, n-propanol, iso-propanol, and butanol); and so forth. Particularly suitable protic solvents are aliphatic alcohols, such as ethanol, propanol, methanol, iso-propanol, butanol, and so forth.

The washing cycle may include one or more washing stages in which the polyarylene sulfide is contacted with a washing solution. In one particular embodiment, for instance, the washing cycle may include a first washing stage in which the polyarylene sulfide is contacted with a first washing solution that contains an organic solvent as a principal component. The first washing stage may include one or multiple distinct washing steps. For example, the first washing stage may include from 1 to 10, in some embodiments from 1 to 6, and in some embodiments, from 2 to 4 distinct steps in which a first washing solution is contacted with the polyarylene sulfide. During this stage, the ratio of solids (e.g., polymer) to liquids typically ranges from about 1 to about 10, and some embodiments, from about 2 to about 8. The first washing stage may also be generally conducted for a time period of from about 1 minute to about 500 minutes, and in some embodiments, from about 5 minutes to about 360 minutes. Regardless, the first washing solution generally contains the organic solvent in an amount of about 50 wt. % or more, in some embodiments about 60 wt. % or more, in some embodiments about 75 wt. % or more, and in some embodiments, from about 85 wt. % to 100 wt. % of the first washing solution. Through the use of such a "solvent-rich" washing solution, organic impurities can be readily removed that would otherwise produce odor and can minimize the extent to which oligomers are removed. In certain cases, it may be desirable to employ a first washing solution that contains organic solvents in an amount of about 95 wt. % or more (e.g., 100 wt. %). In other embodiments, however, the first washing solution may also contain water to help minimize the extent that the organic solvent inadvertently removes shorter polymer chains. When such a mixture is employed, the organic solvent typically constitutes from about 50 wt. % to about 99 wt. %, in some embodiments from about 60 wt. % to 98 wt. %, in some embodiments from about 75 wt. % to about 96 wt. %, and in some embodiments, from about 85 wt. % to about 95 wt. % of the first washing solution, while water typically constitutes from about 1 wt. % to about 50 wt. %, in some embodiments from about 2 wt. % to 40 wt. %, in some embodiments from about 4 wt. % to about 25 wt. %, and in some embodiments, from about 5 wt. % to about 15 wt. % of the first washing solution.

After the first washing stage, the polyarylene sulfide may also be subjected to a second washing stage in which the polyarylene sulfide is contacted with a second washing solution that contains water (e.g., deionized water, recycled water, etc.) as a primary component. The second washing stage may include one or multiple distinct washing steps. For example, the second washing stage may include from 1 to 20, in some embodiments from 2 to 15, and in some embodiments, from 4 to 10 distinct steps in which a second washing solution is contacted with the polyarylene sulfide. During this stage, the ratio of solids (e.g., polymer) to liquids typically ranges from about 1 to about 10, and some embodiments, from about 2 to about 8. The first washing stage may also be generally conducted for a time period of from about 1 minute to about 500 minutes, and in some embodiments, from about 5 minutes to about 360 minutes. Regardless, the second washing solution generally contains water in an amount of about 50 wt. % or more, in some embodiments about 70 wt. % or more, in some embodiments about 80 wt. % or more, and in some embodiments, from about 85 wt. % to about 100 wt. % of the second washing solution. In certain cases, it may be desirable to employ a second washing solution that contains water in an amount of about 95 wt. % or more (e.g., 100 wt. %). In other embodiments, however, the second washing solution may also contain an organic solvent if so desired. When such a mixture is employed, the organic solvent typically constitutes from about 0.1 wt. % to about 30 wt. %, in some embodiments from about 0.2 wt. % to 20 wt. %, and in some embodiments, from about 0.5 wt. % to about 10 wt. % of the second washing solution, while water typically constitutes from about 70 wt. % to about 99.9 wt. %, in some embodiments from about 80 wt. % to 99.8 wt. %, and in some embodiments, from about 90 wt. % to about 99.5 wt. % of the first washing solution. The use of such a "water-rich" washing step helps extract any residual organic solvents, unreacted compounds, and/or impurities from the polymer without causing any excessive removal of short chain polymer molecules.

If desired, both the first and second washing solutions may be generally free of acetyl compounds (e.g., acetone and/or acetic acid) in that such compounds are present in an amount of no more than about 0.1 wt. %, in some embodiments no more than about 0.05 wt. %, and in some embodiments, and in some embodiments, no more than about 0.01 wt. % of a washing solution. Without intending to be limited by theory, the use of such washing solutions can minimize the extent of odor-producing side reactions that would otherwise occur in an acetyl-based washing process. Of course, various other suitable materials may also be used in the washing solutions, such as stabilizers, surfactants, pH modifiers, etc. For example, basic pH modifiers may be employed to help raise the pH of the washing solution to the desired level, which is typically above 7, in some embodiments from about 8.0 to about 13.5, in some embodiments from about 9.0 to about 13.5, and in some embodiments, from about 11.0 to about 13.0. Suitable basic pH modifiers may include, for instance, ammonia, alkali metal hydroxides (e.g., sodium hydroxide, lithium hydroxide, potassium hydroxide, etc.), alkaline earth metal hydroxides, etc., as well as combinations thereof. Further, the solutions may also contain low levels of impurities (e.g., chloride, sodium, product of decomposition of monomer and solvent, etc.), particularly when recycled solutions are employed.

The use of certain washing temperatures may help improve the purity of the resulting polymer, as well as enhance the efficiency of the washing process. For example, the second "water-rich" washing solution may be at a temperature of about 90° C. or more, in some embodiments from about 90° C. to about 200° C., in some embodiments from about 95° C. to about 180° C., and in some embodiments, from about 100° C. to about 160° C. Through the use of such high temperatures for the "water-rich" solution, any residual oligomers may melt so that they can be more readily extracted. The temperature of the first "solvent-rich" washing solution may vary, but is typically less than the temperature used for the "water-rich" solution. For example, the temperature of the "solvent-rich" solution may be from about 10° C. to about 90° C., in some embodiments from about 15° C. to about 80° C., in some embodiments from about 20° C. to about 60° C., and in some embodiments, from about 25° C. to about 50° C. Notably, the use of a lower temperature for the "solvent-rich" solution can minimize the degree to which oligomers are removed and is economically advantageous as less heating is required. In certain cases, heating may be conducted at a temperature that is above the atmospheric pressure boiling point of a solvent in the mixture. In such embodiments, the heating is typically conducted under a relatively high pressure, such as above 1 atm, in some embodiments above about 2 atm, and in some embodiments, from about 3 to about 10 atm.

The manner in which the polyarylene sulfide is contacted with the first and second washing solutions may vary as desired. In one embodiment, for instance, a system may be employed in which the polyarylene sulfide is contacted with the washing solutions within a vessel, such as a bath, sedimentation column, etc. Referring to FIGS. 1-3, for instance, one embodiment of a sedimentation column 10 is shown that is configured to receive a polyarylene sulfide and washing solution. The sedimentation column 10 may include an upper section 12 that includes liquid outlet 20, a middle section 14 that includes inlet 24, and a lower section 16 that includes a solids outlet 22 and a liquid inlet 26. Though illustrated with a vertical arrangement, it should be understood that the sedimentation column may be utilized at other than a vertical arrangement, and the sedimentation column may be at an angle to vertical as long as solids flow through the sedimentation column from the inlet 24 to the outlet 22 may be by gravitational force.

The upper section 12 and the lower section 16 may have cross sectional areas that are larger than that of the middle section 14. In one embodiment, the sections of the sedimentation column 10 may be circular in cross section, in which case the upper section 12 and lower section 16 may have cross sectional diameters that are larger than the cross sectional diameter of the middle section 14. For instance, the upper section 12 and the lower section 16 may have diameters that are from about 1.4 to about 3 times greater than the diameter of the middle section. For instance, the upper and lower sections may independently have diameters that are about 1.4, about 2, or about 2.5 times greater than the diameter of the middle section 14. The larger cross sectional area of the upper section 12 may prevent overflow of solids at the outlet 20 and the larger cross sectional area of the lower section 16 may prevent solids flow restriction at the outlet 22. It should be understood that the sedimentation column 10 is not limited to any particular geometric shape and the cross section of the sedimentation column is not limited to circular. Moreover, the cross sectional shape of each section of the sedimentation column may vary with regard to one another. For example, one or two of the upper section 12, the middle section 14, and the lower section 16 may have an oval-shaped cross section, while the other section(s) may be round in cross section.

The middle section 14 of the sedimentation column 10 may include an inlet 24 through which a polymer slurry may be fed to the sedimentation column 10. The slurry may include the polyarylene sulfide in conjunction with other byproducts from the formation process, such as reaction solvents (e.g., N-methylpyrrolidone), salt byproducts, unreacted monomers or oligomers, etc. As shown in FIG. 2, the inlet 24 meets a wall 25 of the middle section 14 substantially tangent to the wall 25. The term "substantially tangent" as utilized herein may be determined by the distance between the true tangent of the wall 25 of the middle section 14 and the outer wall 27 of the inlet 24. When the inlet 24 meets the wall 25 of the middle section at a perfect tangent, this distance will be 0. In general, this distance will be less than about 5 centimeters, for instance less than about 3 centimeters. Placement of the inlet 24 such that the inlet 24 is substantially tangent to the outer wall 25 of the middle section 14 may prevent disruption of the fluid flow pattern within the sedimentation column 10. This may improve contact and mass transfer between the downward flowing solids and the upward flowing liquid and may also prevent loss of solids through the outlet 20 of the upper section 12. To further ensure that solids are not lost through the outlet 20, the inlet 24 may be placed in the middle section 14 at a distance from the junction 23 where the middle section 14 meets the upper section 12. For instance, the vertical distance between the midpoint of the inlet 24 and the junction 23 may be equal to or greater than about 5% of the total height of the middle section 14. For instance, the vertical distance between the midpoint of the inlet 24 and the junction 23 may be from about 5% to about 50% of the total height of the middle section 14. The total height of the middle section 14 is that distance between the junction 23, where the upper section 12 meets the middle section 14 and the junction 21, where the middle section 14 meets the lower section 16.

The line at inlet 24 may carry the slurry from a polymerization reaction apparatus to the middle section 14 of the sedimentation column 10. The middle section 14 of the sedimentation column may include an agitator 30 that incorporates an axial shaft 31 and a series of stirring blades 32 along the axial length of the middle section 14. The agitator 30 may minimize channeling of liquid within the sediment (fluidized bed) and may maintain contact between the slurry contents and the upwardly flowing solvent as well as maintain flow of the solids through the sedimentation column 10. The stirring blades 32 may extend from the axial shaft 31 toward the wall 25 of the middle section 14. In general, the stirring blades may extend at least half of the distance from the axial shaft to the wall 25 and, in one embodiment, may extend almost all of the way to the wall 25. In one embodiment, the sedimentation column may be free of sedimentation plates or trays as have been utilized in previously known sedimentation columns.

As shown, the axial shaft 31 may support a series of stirring blades 32 along the length of the middle section 14. In general, at least two stirring blades 32 may extend from the axial shaft 31 in a balanced arrangement at each point of blade extension. This is not a requirement, however, and three, four, or more stirring blades may extend from the axial shaft 31 at a single location along the shaft 31 or alternatively, a single blade may extend from a single location on the shaft 31 and the stirring blades may be offset from one another as they pass down the length of the shaft 31 so as to maintain balance of the agitator 30 during use. The axial shaft 31 may have stirring blades 32 extending therefrom at a plurality of locations along the shaft 31. For instance, the axial shaft may have stirring blades extending therefrom at from about 3 to about 50 locations along axial shaft 31, with two or more stirring blades 32 extending from the axial shaft at each location. In one embodiment, the distribution of the blades along the axial shaft 31 may be such that there are more blades in the fluidized bed section at the bottom as compared to the number of blades in the upper portion of section 14. During operation, the axial shaft 31 may rotate at a speed that is typically from about 0.1 rpm to about 1000 rpm, for instance from about 0.5 rpm to about 200 rpm or from about 1 rpm to about 50 rpm.

In the illustrated embodiment, a countercurrent flow is employed in which the polymer slurry flow is in a direction opposite to that of the flow of the washing solution. Referring again to FIG. 1, for instance, the polymer slurry is fed to the middle section 14 of the sedimentation column 10 via the inlet 24. A washing solution is, on the other hand, fed to the lower section 16 of the column 10 via an inlet 26. In this manner, the washing solution can flow upwardly through the column as it contacts the polymer slurry as it flows downwardly through the column towards the solids outlet 22. If desired, the inlet 26 may include a distributor 35 that may enhance fluid flow through the solids and prevent solids from entering the inlet 26. The lower section 16 may also have a conical shape to concentrate the solids content at the outlet 22. The solids content of the slurry at the outlet 22 may generally be about 20 wt. % or greater, or about 22 wt. % or greater in some embodiments. If desired, a washing solution may be heated prior to being fed to the inlet 26, such as described above. In such embodiments, the sedimentation column may include heating elements to maintain an elevated temperature during the washing process.

If desired, a fluidized bed may also be formed in the sedimentation column with increasing concentration of solids from the top of the bed to the solids outlet 22. The fluidized bed height may be monitored and controlled so as to better control the residence time of solids in the sedimentation column. Through improved control of residence time for the sedimentation column, the efficiency of the separation process carried out within the sedimentation column may be improved, which may translate to lower operational costs and improved separations. In addition, control of the fluidized bed height and residence time may help to prevent solids loss through the liquid outlet 20 of the upper section 12. A sensor may be used to monitor the fluidized bed height within the sedimentation column 10. The sensor type is not limited and may be any suitable sensor that may monitor the fluidized bed height including both internal sensors and external sensors. For example, sensors may utilize, without limitation, optical, infrared, radio frequency, displacement, radar, bubble, vibrational, acoustic, thermal, pressure, nuclear and/or magnetic detection mechanisms to determine the fluidized bed height within the sedimentation column 10. By way of example, in one embodiment, an optical sensor 40 (e.g., a laser-based sensor including a laser source and a detector) may be located within the middle section 14 of the sedimentation column 10, for instance near the level of the inlet 24, which may detect reflection of the laser to determine relative density differences of the materials within the sedimentation column 10 and thus convey information concerning the location of the top of the fluidized bed to a control system. The control system may relay that information to a valve that may control flow of solids out of the sedimentation column at outlet 22 and/or a valve that may control flow of solids into the sedimentation column at inlet 24 so as to control the bed height. Surge tanks may also be included in the lines leading to and from the sedimentation column as is known to maintain control of the fluidized bed height. Other systems as are known in the art for controlling the height of a fluidized bed may alternatively be utilized, and the method and system utilized to control the bed height is not particularly limited. The top of the fluidized bed may be at or near the inlet 24. To improve control of the residence time of the solids in the sedimentation column 10, the sediment bed height variation during the process may vary less than about 10% of the total height of the middle section 14. For instance, the fluidized bed height variation during a process may be less than about 5% of the total height of the middle section 14.

Though illustrated in FIG. 1 as a cylindrical column, the longitudinal cross-sectional shape of the middle section 14 is not limited to this embodiment. For example, and as illustrated in FIG. 3, middle sections 14a, 14b, and 14c of sedimentation columns may be straight or tapered with increasing angles from a cylindrical middle section as illustrated at 14a to increasing angles as shown at 14b and 14c. When tapered, the middle section may be wider at the top than at the bottom so as to increase solids concentration at the bottom of the sedimentation column without impeding transport of solids. That is, if the angle of taper is too large, solids flow may be impeded at the wall of the middle section. A preferred taper angle will vary for each system depending upon flow rates, physical properties of the compounds to be carried within the system such as particle size and shape, as well as depending on column materials and surface roughness.

The first and second washing stages may be performed within a single apparatus (e.g., sedimentation column) such as shown in FIGS. 1-3. In such embodiments, the polyarylene sulfide may be initially contacted with the first washing solution via the inlet 26. The first washing solution may flow through the column in a direction counter to that of the polymer slurry until reaching the outlet 20, where the solution is removed. Thereafter, the polyarylene sulfide may be contacted with the second washing solution via the inlet 26. The second washing solution may also flow through the column in a direction counter to that of the polymer slurry until reaching the outlet 20. Of course, in alternative embodiments, multiple sedimentation columns may be used in series, one or more of which have a countercurrent flow such as described above. In one embodiment, for instance, the first washing solution may be supplied to a first sedimentation column where it flows in a direction counter to that of the polymer slurry until reaching an outlet. A solids outlet may thereafter feed solids from the first sedimentation column to a slurry inlet of a second sedimentation column. A second washing solution will may then flow through the second column in a direction counter to that of the solids until reaching an outlet.

During the washing process, the polyarylene sulfide is typically separated from the washing solution (e.g., within a countercurrent washing apparatus). If desired, however, additional separation techniques may also be employed, such as vibratory screening, etc.

III. Heat Treatment

Regardless of the particular washing technique employed, the washed and optionally separated polyarylene sulfide may be subjected to a heat treatment to help reduce the volatile content. As noted above, the heat treatment generally occurs in the presence of an inert gas and at a relatively high temperature, such as from about 150° C. to about 275° C., in some embodiments from about 180° C. to about 270° C., and in some embodiments, from about 225° C. to about 265° C. If desired, the inert gas may be recycled. As a result of this treatment, the polyarylene sulfide may have a relatively low volatile content and Yellowness Index as indicated above. Although by no means required, it is sometimes desirable to subject the polyarylene sulfide to a drying step prior to the heat treatment. When performed, the drying step is typically conducted at a relatively low temperature, such as from about 80° C. to about 150° C., in some embodiments from about 90° C. to about 145° C., and in some embodiments, from about 100° C. to about 140° C. If desired, drying may occur in an ambient atmosphere (e.g., air) or in the presence of an inert gas such as described above.

The present invention may be better understood with reference to the following example.

Test Methods

Molecular Weight: A sample of PPS may be initially converted to PPSO by oxidation with a mixture of cold $HNO_3$ (50%) in a trifluoroacetic acid mixture. The resulting PPSO may be dissolved in warm hexafluoroisopropanol (HFIP) for 1 hour and then analyzed for molecular weight by GPC equipped with PSS-hexafluoroisopropanol (HFIP) gel columns. The gel columns may be fitted with an HFIP-gel guard column using HFIP as mobile phase and refractive index (RI) as detector.

Melt Viscosity: The melt viscosity may be determined as scanning shear rate viscosity and determined in accordance with ISO Test No. 11443:2005 (technically equivalent to ASTM D3835-08) at a shear rate of 1,200 s$^{-1}$ and at a temperature of about 310° C. using a Dynisco 7001 capillary rheometer. The rheometer orifice (die) may have a diameter of 1 mm, a length of 20 mm, an L/D ratio of 20.1, and an entrance angle of 180°. The diameter of the barrel may be 9.55 mm+0.005 mm and the length of the rod was 233.4 mm. Prior to measurement, samples are dried in a vacuum oven for 1.5 hours at 150° C.

Crystallization Temperature: The crystallization temperature may be determined by differential scanning calorimetry ("DSC") as is known in the art. Under the DSC procedure, samples are heated during a first heating cycle at a rate of 50° C. per minute to a temperature of 340° C., cooled at a rate of 10° C. per minute to a temperature of 50° C., and then heated during a second heating cycle at a rate of 50° C. per minute to a temperature of 340° C., and cooled again at a rate of 10° C. per minute to a temperature of 50° C. using DSC measurements conducted on a TA Q2000 Instrument. The temperature at the highest point of the exothermic curve obtained during the second heating cycle is generally referred to herein as the "crystallization temperature."

Oligomer Content: The oligomer content of a sample may be determined by contacting the sample with an extraction solution that contains 100 wt. % chloroform at a temperature of 60° C. and pressure of 1,500 psi. The sample is rinsed twice with the extraction solution, and thereafter the extracted solvent is dried and the weight of the extractables is measured. The oligomer content is determined by dividing the weight of the extractables by the weight of the original sample, and then multiplying by 100.

Volatile Content: The volatile content may be determined by subjecting a sample to a high temperature and then trapping any resulting "outgas", which is then analyzed by gas chromatography using known techniques. More particularly, 3.0 grams of a dried sample may be placed in a glass tube and then heated to 320° C. for 20 minutes. The off-gas or volatile materials generated are trapped by means of a cold-trap. Once trapped, the off-gas is analyzed in a solution of acetonitrile by gas chromatography to determine the presence of volatile compounds (e.g., MO, MMP, BL, DAA, PhSH, MeSPh, pDCB, NMP, etc.). Biphenyl is used as an internal standard for the analysis.

Residual Ash: To determine the amount of residual inorganic residue (e.g., sodium chloride), an ash test may be performed. More particularly, about 4 grams of a dried sample may be placed in a clean porcelain crucible with a quartz cover. The crucible is placed in a muffle furnace and heated to 750° C. for 12 hours. After cooling, the crucible is allowed to cool to room temperature in a desiccator. The weight is of residual ash is determined.

Yellowness Index: The yellowness index of a sample may be determined in accordance with ASTM E313-15 (illuminant D65, 10 degree observer).

Example

A polyphenylene reaction slurry is made from a process that involves the reaction of NaSH, pDCB, NMP, NaOH, and water. After the polymerization process, substantial amount of the NaCl by-product and NMP are removed from the slurry by shaking on a sieve screen (106 microns). The polymer is then re-slurried in acetone containing 200 ppm of MMP and 1500 ppm of MO (PPS:Acetone by weight=1:5). After mixing for 10 minutes, the slurry is filtered through a 106-micron screen. The acetone re-slurrying steps are repeated 3 more times. The polymer granules are washed 6 times with water and dried in an oven under constant nitrogen purge at 105° C. for 1.5 hours. During this time, exposure to light is kept to minimum to preserve the initial yellowness index of the flake. The PPS sample is divided into three portions. Two of the portions are then subjected to heat treatment under air or nitrogen. To perform the heat treatment, about 4.5 grams of the dried PPS flakes are disposed in a 0.5-inch OD glass tube, which is then placed in an aluminum heating block maintained at 250° C. The heat treatment under air is conducted for 3 hours and the heat treatment under nitrogen is conducted for 3 hours by connecting a feed of slow flow nitrogen. After cooling, the samples are then analyzed for volatiles content. The results are shown in Table 1 below.

TABLE 1

| Volatiles (in mg/kg) | Without Heat Treatment | With Heat Treatment Under Air | With Heat Treatment under N$_2$ |
|---|---|---|---|
| Mesityl oxide (MO) | 174 | Not measured sample degraded | <1 |
| Diacetone alcohol (DAA) | 60 | Not measured sample degraded | <1 |
| Thiophenol (PhSH) | 4 | Not measured sample degraded | <1 |
| 4-Mercapto-4-methyl-penta-2-one (MMP) | 22 | Not measured sample degraded | <1 |
| Butyrolactone (BL) | 390 | Not measured sample degraded | 62 |
| p-Dichlorobenzene (pDCB) | 43 | Not measured sample degraded | <1 |
| Methylthiophenol (MeSPh) | 0 | Not measured sample degraded | <1 |
| N-Methylpyrrolidone (NMP) | 14 | Not measured sample degraded | <1 |
| Total Volatile Content | 709 | Not measured sample degraded | 62 |

The yellowness index was also determined and was 6.25 without heat treatment, 53.31 with heat treatment under air, and 9.49 with heat treatment under nitrogen.

While particular embodiments of the present disclosure have been illustrated and described, it would be apparent to one skilled in the art that various other modifications may be made without departing from the spirit and scope of the disclosure. It is therefore intended to cover in the appended claims all such changes and modifications that are within the scope of this disclosure.

What is claimed is:

1. A method for forming a polyarylene sulfide, the method comprising subjecting a polyarylene sulfide to a washing cycle to form a washed polyarylene sulfide, the washing cycle including a first washing stage and a subsequent second washing stage, the first washing stage including contacting the polyarylene sulfide with a first washing solution and the second washing stage including contacting the polyarylene sulfide with a second washing solution; the method further comprising thereafter subjecting the washed polyarylene sulfide to a heat treatment in the presence of an atmosphere that includes an inert gas, wherein the heat treatment occurs at a temperature of from about 150° C. to about 275° C.

2. The method of claim 1, wherein the heat treatment occurs for a time period of from about 0.1 to about 15 hours.

3. The method of claim 1, wherein the inert gas includes nitrogen, helium, argon, xenon, neon, krypton, radon, or a combination thereof.

4. The method of claim 1, wherein inert gases constitute from about 90 wt. % to 100 wt. % of the atmosphere.

5. The method of claim 1, wherein the inert gas is recycled.

6. The method of claim 1, wherein after being subjected to the heat treatment, the polyarylene sulfide has a volatile content of about 175 parts per million or less.

7. The method of claim 1, wherein after being subjected to the heat treatment, the polyarylene sulfide has a mesityl oxide content of about 75 ppm or less, a butyrolactone content of about 65 ppm or less, an N-methylpyrrolidone content of about 20 ppm or less, and/or a pDCB content of about 4 ppm or less.

8. The method of claim 1, wherein after being subjected to the heat treatment, the polyarylene sulfide has a Yellowness Index of about 15 or less.

9. The method of claim 1, wherein after being subjected to the heat treatment, the polyarylene sulfide has an oligomer content of from about 0.5 wt. % to about 2 wt. %.

10. The method of claim 1, wherein the polyarylene sulfide is a linear polyphenylene sulfide.

11. The method of claim 1, wherein the first washing solution contains an organic solvent in an amount of about 50 wt. % or more and the second washing solution contains water in an amount of about 50 wt. % or more.

12. The method of claim 11, wherein the second washing solution is at a temperature of about 90° C. or more.

13. The method of claim 11, wherein the organic solvent includes N-methylpyrrolidone.

14. The method of claim 11, wherein the first washing solution also contains water.

15. The method of claim 1, wherein both or either of the washing solutions are generally free of acetone.

16. The method of claim 1, wherein the polyarylene sulfide is contacted with both or either of the washing solutions within a sedimentation column.

17. The method of claim 1, further comprising separating the washed polyarylene sulfide from both or either of the washing solutions prior to heat treatment.

18. The method of claim 1, further comprising drying the washed polyarylene sulfide prior to the heat treatment.

19. The method of claim 18, wherein drying occurs at a temperature of from about 80° C. to about 150° C.

20. The method of claim 1, wherein after being subjected to the heat treatment, the polyarylene sulfide has a melt viscosity of from about 100 to about 2,000 poise, as determined in accordance with ISO Test No. 11443:2005 at a shear rate of 1200 s$^{-1}$ and at a temperature of 310° C.

21. The method of claim 1, wherein after being subjected to the heat treatment, the polyarylene sulfide has a number average molecular weight of from about 20,000 to about 60,000 Daltons.

22. The method of claim 1, wherein after being subjected to the heat treatment, the polyarylene sulfide has a yellowness index of about 10 or less, as determined in accordance with ASTM E313-15 (illuminant D65, 10 degree observer).

* * * * *